(12) United States Patent
Lee

(10) Patent No.: US 9,395,759 B2
(45) Date of Patent: Jul. 19, 2016

(54) PROTECTIVE WINDOW FOR DISPLAY DEVICE AND DISPLAY DEVICE INCLUDING THE SAME

(71) Applicant: SAMSUNG DISPLAY CO., LTD., Yongin, Gyeonggi-Do (KR)

(72) Inventor: Hyun Hee Lee, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 65 days.

(21) Appl. No.: 14/287,297

(22) Filed: May 27, 2014

(65) Prior Publication Data

US 2015/0043137 A1   Feb. 12, 2015

(30) Foreign Application Priority Data

Aug. 7, 2013   (KR) .......................... 10-2013-0093659

(51) Int. Cl.
*H05K 7/00* (2006.01)
*H05K 5/00* (2006.01)
*G06F 1/16* (2006.01)

(52) U.S. Cl.
CPC ............ *G06F 1/1656* (2013.01); *G06F 1/1626* (2013.01); *G06F 1/1637* (2013.01); *Y10T 428/24868* (2015.01); *Y10T 428/2848* (2015.01)

(58) Field of Classification Search
CPC .................................. G06F 3/041; G06F 1/01
USPC ..................................................... 361/679.01
See application file for complete search history.

(56) References Cited

U.S. PATENT DOCUMENTS

| 2010/0039398 | A1* | 2/2010 | Lin .......................... G06F 3/041 345/173 |
| 2013/0033776 | A1 | 2/2013 | Harding et al. |
| 2013/0194212 | A1* | 8/2013 | Shin ......................... G06F 3/041 345/173 |

FOREIGN PATENT DOCUMENTS

| KR | 10-20090132074 A | 12/2009 |
| KR | 10-2011-0109963 A | 10/2011 |

\* cited by examiner

*Primary Examiner* — Jerry Wu
(74) *Attorney, Agent, or Firm* — Lee & Morse, P.C.

(57) ABSTRACT

A display device and a protective window, the device including a display unit displaying an image; a first protective window on the display unit; and a second protective window unit on the first protective window, the second protective window unit including a display area displaying the image and a peripheral area around the display area, wherein the second protective window unit includes a second protective window; an ink layer in the peripheral area on one surface of the second protective window, the ink layer showing a color; and a second protective window adhesive layer on the one surface of the second protective window and on the ink layer, the second protective window unit is adhered on the first protective window by the second protective window adhesive layer, and the second protective window adhesive layer has an adhesion to the first protective window of about 10 g/25 mm to about 100 g/25 mm.

13 Claims, 5 Drawing Sheets

PROTECTIVE WINDOW FOR DISPLAY DEVICE AND DISPLAY DEVICE INCLUDING THE SAME

CROSS-REFERENCE TO RELATED APPLICATION

Korean Patent Application No. 10-2013-0093659, filed on Aug. 7, 2013, in the Korean Intellectual Property Office, and entitled: "Protective Window For Display Device and Display Device With The Same," is incorporated by reference herein in its entirety.

BACKGROUND

1. Field

Embodiments relate to a protective window for a display device and a display device including the same.

2. Description of the Related Art

Portable terminals, e.g., mobile phones or personal information terminals, may include a display unit to display an image, and may use a protective window for protecting the display unit from an impact from outside and inflow of foreign matters.

Such a protective window may not only protect the display device, but may also show a color in an area excluding (e.g., around) an area where an image is displayed.

The above information disclosed in this Background section is only for enhancement of understanding of the background of the invention and therefore it may contain information that does not form the prior art that is already known in this country to a person of ordinary skill in the art.

SUMMARY

Embodiments are directed to a protective window for a display device and a display device including the same.

The embodiments may be realized by providing a display device including a display unit displaying an image; a first protective window on the display unit; and a second protective window unit on the first protective window, the second protective window unit including a display area displaying the image and a peripheral area around the display area, wherein the second protective window unit includes a second protective window; an ink layer in the peripheral area on one surface of the second protective window, the ink layer showing a color; and a second protective window adhesive layer on the one surface of the second protective window and on the ink layer, the second protective window unit is adhered on the first protective window by the second protective window adhesive layer, and the second protective window adhesive layer has an adhesion to the first protective window of about 10 g/25 mm to about 100 g/25 mm.

The second protective window adhesive layer may include an acryl adhesive, a urethane adhesive, a polyimide adhesive, a polyethylene adhesive, or an epoxy adhesive.

The display device may further include a pattern layer between the second protective window adhesive layer and the second protective window and between the ink layer and the second protective window, the pattern layer having a pattern formed at a region overlying the peripheral area.

The pattern layer may be adhered on the one surface of the second protective window by a pattern adhesive layer.

The first and second protective windows may be made of transparent glass or plastic.

The color may be a first color.

The color may be a second color.

The display unit may include a liquid crystal display panel.

The embodiments may be realized by providing a protective window for a display device including a protective window; an ink layer on one surface of the protective window, the ink layer showing a color; and a protective window adhesive layer on the one surface of the protective window and on one surface of the ink layer, wherein the protective window adhesive layer has an adhesion to glass or plastic of about 10 g/25 mm to about 100 g/25 mm.

The protective window adhesive layer may include an acryl adhesive, a urethane adhesive, a polyimide adhesive, a polyethylene adhesive, or an epoxy adhesive.

The protective window may further include a pattern layer between the protective window adhesive layer and the protective window and between the ink layer and the protective window, the pattern layer having a pattern formed therein.

The pattern layer may be adhered on the one surface of the protective window by a pattern adhesive layer.

The protective window may be made of transparent glass or plastic.

The color may be a first color.

The color may be a second color.

The embodiments may be realized by providing a display device system including a display unit that displays an image; a first protective window on the display unit; and at least two second protective window units, the at least two second protective window units being alternatively attachable to the first protective window such that only one of the second protective window units is on the first protective window at one time, wherein each second protective window unit includes a display area that displays the image and a peripheral area around the display area, a second protective window; an ink layer in the peripheral area on one surface of the second protective window, the ink layer showing a color; and a second protective window adhesive layer on the one surface of the second protective window and on one surface of the ink layer, each second protective window unit being adhered on the first protective window by the second protective window adhesive layer, and each second protective window adhesive layer has an adhesion to the first protective window of about 10 g/25 mm to about 100 g/25 mm.

The ink layer of one of the second protective window units may show a first color, the ink layer of another one of the second protective window units may show a second color, and the first color may be different from the second color.

Each second protective window adhesive layer may include an acryl adhesive, a urethane adhesive, a polyimide adhesive, a polyethylene adhesive, or an epoxy adhesive.

The first and second protective windows may be made of transparent glass or plastic.

The display unit may include a liquid crystal display panel.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
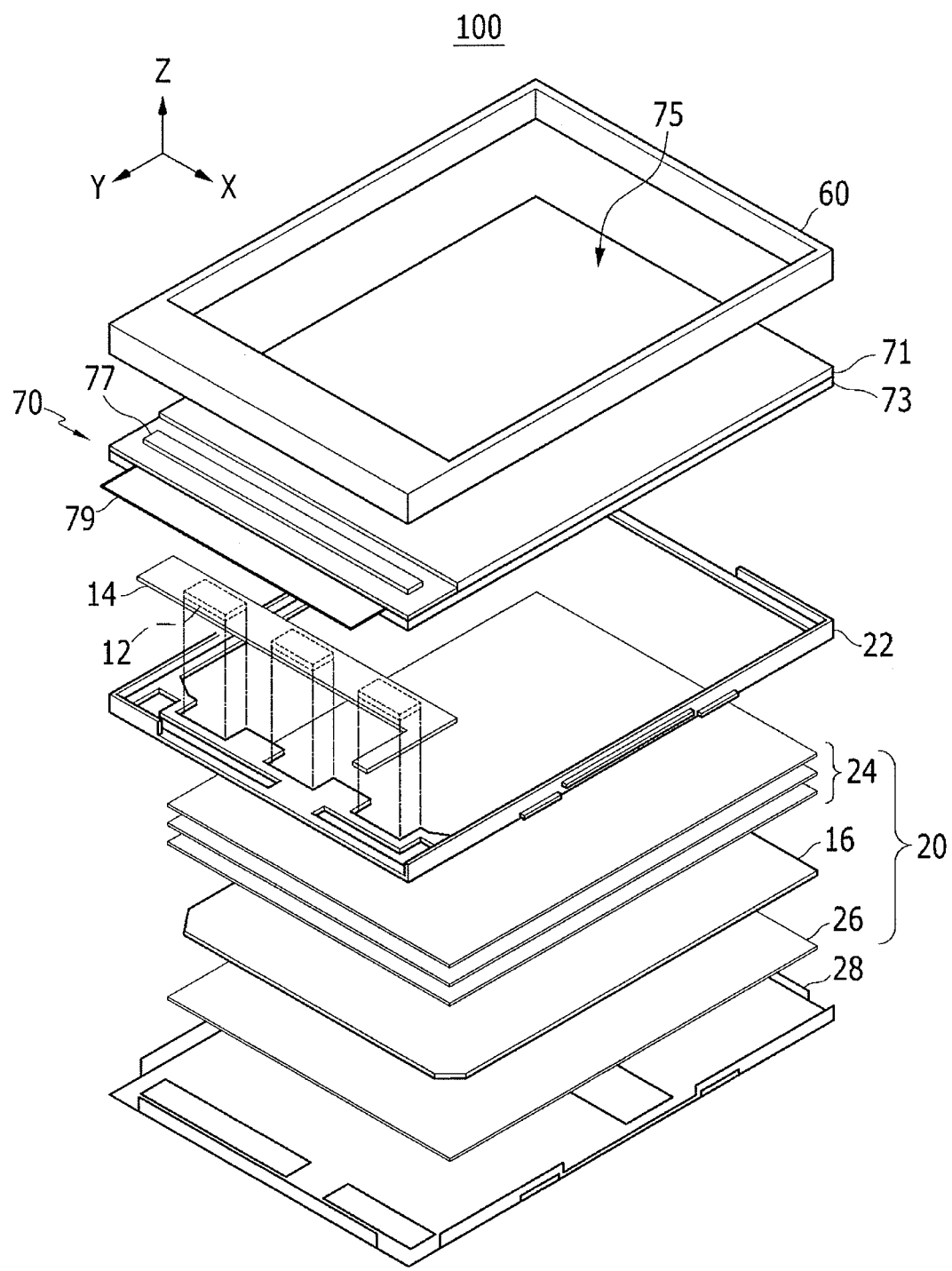
FIG. 1 illustrates an exploded perspective view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. Further, in the specification, the word "on" means positioning on or below the object portion, but does not essentially mean positioning on the upper side of the object portion based on a gravity direction.

FIG. 1 illustrates an exploded perspective view of a display device according to an embodiment.

Referring to FIG. 1, the display device 100 according to the present embodiment may include a backlight assembly 20 (that supplies light) and a display panel assembly 70 (that receives the light and displays an image). The display panel assembly 70 may be, e.g., a liquid crystal panel assembly including a liquid crystal layer.

The display device 100 may include a top chassis 60, a mold frame 22, and a bottom chassis 28 for fixing and supporting the backlight assembly 20 and the display panel assembly 70. In the present embodiment, the display device 100 may include the top chassis 60. In an implementation, the display device 100 may not include the top chassis 60, e.g., the top chassis 60 may be omitted.

The display panel assembly 70 may include a display panel 75, an integrated circuit chip 77, and a flexible printed circuit board 79.

The display panel 75 may include a thin film transistor display panel 73 (including a plurality of thin film transistors), a color filter display panel 71 (on or over the thin film transistor display panel 73), and liquid crystal (not illustrated) injected between the display panels.

A polarizing plate (not illustrated) may be attached on or over the color filter display panel 71 and under the thin film transistor display panel 73, in order to polarize light passing through the display panel 75.

The integrated circuit chip 77 may be on or over the thin film transistor display panel 73 so as to control the display panel 75.

The thin film transistor display panel 73 may include a transparent glass substrate having the thin film transistors formed in a matrix shape. The thin film transistor may have a source terminal connected to a data line, a gate terminal connected to a gate line, and a drain terminal connected to a pixel electrode made of transparent indium tin oxide (ITO) as a conductive material.

The data line and the gate line of the display panel 75 may be connected to the flexible printed circuit board 79. When an electrical signal is inputted from the flexible printed circuit board 79, an electrical signal may be provided to the source and gate terminals of the thin film transistor, and the thin film transistor may be turned on or off according to the input of the electrical signals, and an electrical signal for pixel formation or display is outputted to the drain terminal.

The flexible printed circuit board 79 may receive an image signal from outside the display panel 75, and may apply a driving signal to the data line and the gate line of the display panel 75.

The color filter display panel 71 may be on or over the thin film transistor display panel 73 so as to face the thin film transistor display panel 73. The color filter display panel 71 may be a substrate having a color filter (formed through a thin film process), and an entire surface of the color filter display panel 71 may be coated with a common electrode made of ITO. When light passes through the color filter, the color filter may show a predetermined color.

When the thin film transistor is turned on in response to power applied to the gate and source terminals thereof, an electric field may be formed between the pixel electrode and the common electrode of the color filter display panel. An orientation angle of liquid crystal (between the thin film transistor display panel 73 and the color filter display panel 71) may be changed by the electric field. Then, light transmittance may be varied according to the changed orientation angle, thereby obtaining a desired image.

The flexible printed circuit board 79 may generate a data signal and a gate driving signal (for driving the display device 100) and a plurality of timing signals (for applying the data signal and the gate driving signal at an appropriate time), and may apply the gate driving signal and the data driving signal to the gate line and the data line of the display panel 75, respectively.

Under the display panel 75, the backlight assembly 20 may uniformly provide light to the display panel 75.

The backlight assembly 20 may include one or more light sources 12 fixed to the mold frame 22 and supplying light to the display panel 75 and a light source substrate 14 to supply power to the light sources 12. The light source 12 may be a light emitting diode.

In addition, the backlight assembly 20 may include a light guide panel 16 (that guides light emitted from the light source 12 and supplies the guided light to the display panel 75), a reflecting sheet 26 (under the light guide panel 16 so as to reflect light), and optical sheets 24 (that are on or over the light guide panel 16, that help secure a luminance characteristic of the light from the light source 12, and that help provide the secured luminance characteristic to the display panel 75).

Top and bottom surfaces of the mold frame 22 may be opened, and the mold frame 22 may surround the backlight assembly 20. The mold frame 22 may support the display panel 75.

The bottom chassis 28 may receive and support the backlight assembly 20 and the mold frame 22.

The top chassis 60 may be on or over the display panel assembly 70 so as to protect and support the display panel assembly 70 while bending the flexible printed circuit board 79 to the outside of the mold frame 22.

In addition, a touch screen panel may be on or over the display panel 75 so as to receive a capacitive touch pressure.

Although not illustrated in FIG. 1, an inverter board (serving as a printed circuit board for power supply) and/or a printed circuit board (for signal conversion) may be disposed on a rear surface of the bottom chassis 28. The inverter board may transform an external voltage into a predetermined voltage level and may provide the transformed voltage into the light source 12, and the printed circuit board for signal conversion may be connected to the flexible printed circuit board 79, may convert an analog data signal into a digital data signal, and may provide the converted signal to the display panel 75.

Now, referring to FIGS. 2 to 4, the display device using a protective window according to an embodiment will be described in detail.

Figure 2:
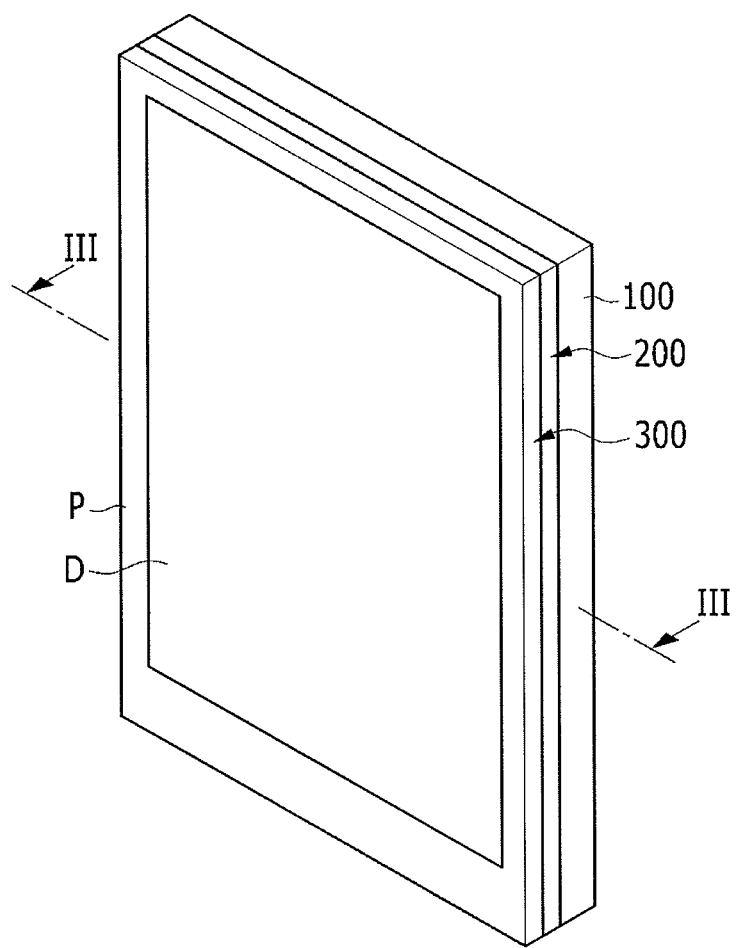
FIG. 2 illustrates a perspective view of the display device using a protective window according to an embodiment.
Figure 3:
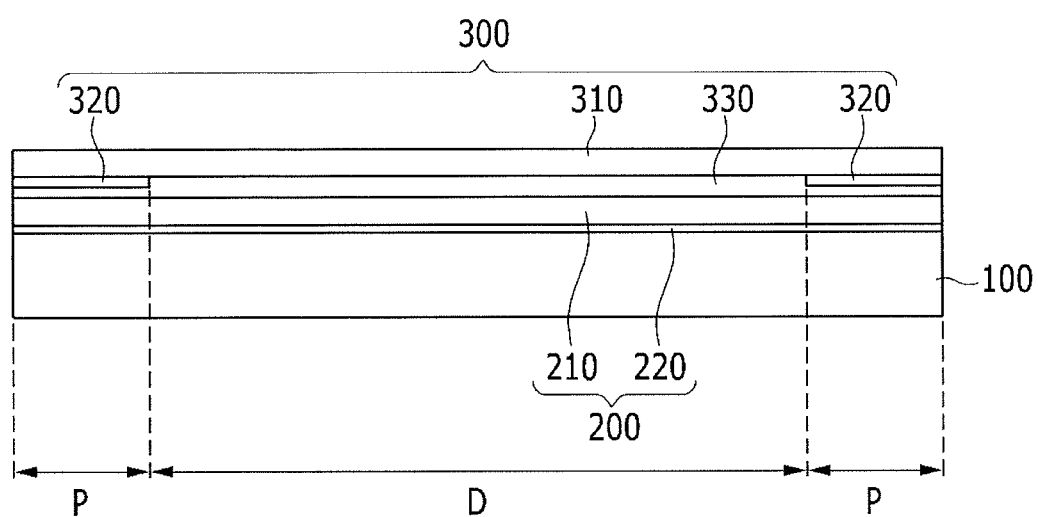
FIG. 3 illustrates a cross-sectional view taken along line of FIG. 2.

FIG. 2 illustrates a perspective view of the display device using a protective window according to an embodiment, and FIG. 3 illustrates a cross-sectional view taken along line of FIG. 2.

Referring to FIGS. 2 and 3, a first protective window unit 200 and a second protective window unit 300 may be sequentially disposed on or over the display device 100.

The first and second protective window units 200 and 300 may protect the display device 100 from an impact from outside and/or inflow of foreign materials. in an implementation, the second protective window unit 300 may not only protect the display device 100, but may also show a color.

The first protective window unit 200 on the display device 100 may include a first protective window 210 and a first protective window adhesive layer 220.

The first protective window 210 may be made of or may include, e.g., transparent glass, plastic, or the like. The first protective adhesive layer 220 may be made of or may include, e.g., transparent adhesive, and the first protective window 210 may be adhered on the display device 100.

The second protective window unit 300 on the first protective window unit 200 may include a display area D and a peripheral area P (positioned around the display area D). The display area D may be an area through which an image displayed on the display device 100 is seen or transmitted, and the peripheral area P may be an area that shows a color, e.g., a bezel.

The second protective window unit 300 may include a second protective window 310, a first ink layer 320, and a second protective window adhesive layer 330.

The second protective window 310 may be made of or may include, e.g., transparent glass, plastic, or the like.

The first ink layer 320 may show a first color, and may be on one, e.g., inner, surface of the second protective window 310. The first ink layer 320 may be in the peripheral area P.

The second protective window adhesive layer 330 may be on the one surface of the second protective window 310 and on the first ink layer 320, and may adhere the second protective window 310 (having the first ink layer 320 thereon) onto the first protective window unit 200.

The second protective window adhesive layer 330 may be made of or may include, e.g., a transparent adhesive such as acryl adhesive, urethane adhesive, polyimide adhesive, polyethylene adhesive, or epoxy adhesive.

The second protective window adhesive layer 330 may have a relatively low adhesion, and the second protective window unit 300 may be easily detached from the first protective window unit 200. The adhesion or adhesive strength of the second protective window adhesive layer 330 may be set to, e.g., about 500 g/25 mm or less. In an implementation, the adhesion of the second protective window adhesive layer 330 may be set to, e.g., about 10 g/25 mm to about 100 g/25 mm.

The protective window unit 300 may be easily detached from the first protective window unit 200, and/or a protective window unit including an ink layer showing a different color may be adhered on the first protective window unit 200, instead of the second protective window unit 300 including the first ink layer 320 showing the first color.

Now, referring to FIG. 4, protective window units displaying different colors will be described.

Figure 4:
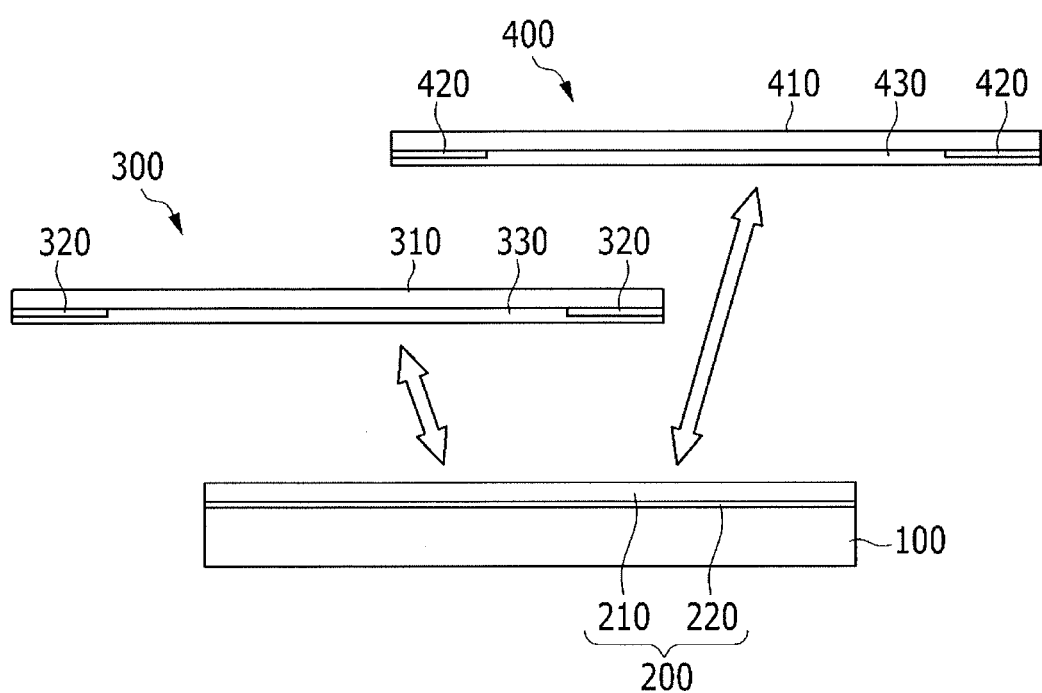
FIG. 4 illustrates a diagram showing the attachability/detachability of protective window units displaying different colors on the display device using a protective widow according to an embodiment.

FIG. 4 illustrates a diagram showing that protective window units displaying different colors may be detachably attached to, e.g., attached to or detached from, the display device using a protective widow according to an embodiment.

Referring to FIG. 4, the second protective window adhesive layer 330 (for adhering the second protective window 310 having the first ink layer 320 thereon onto the first protective window unit 200) may have relatively low adhesion, and the second protective window unit 300 may be easily attached to and/or detached from the first protective window unit 200.

Thus, instead of the second protective window unit 300, a third protective window unit 400 may be adhered on the first protective window unit 200.

The third protective window unit 400 may include, e.g., a third protective window 410, a second ink layer 420, and a third protective window adhesive layer 430.

The third protective layer 410 may be made of or may include, e.g., transparent glass, plastic, or the like.

The second ink layer 420 may show a second color that is different from the first color, and may be on one surface of the third protective window 410. The second ink layer 420 may be in the peripheral area P, e.g., a bezel.

The third protective window adhesive layer 430 may be on the one surface of the third protective window 410 and on the second ink layer 420, and the third protective window 410 (having the second ink layer 420 thereon) may be adhered on the first protective window unit 200.

The third protective window adhesive layer 430 may have a relatively low adhesion, and the third protective window unit 400 may be easily detached from the first protective window unit 200. The adhesion of the second protective window adhesive layer 330 may be set to, e.g., about 500 g/25 mm or less. In an implementation, the adhesion of the second protective window adhesive layer 330 may be set to, e.g., about 10 g/25 mm to 100 g/25 mm.

The third protective window adhesive layer 430 may be made of or may include, e.g., a transparent adhesive such as acryl adhesive, urethane adhesive, polyimide adhesive, polyethylene adhesive or epoxy adhesive.

The second protective window adhesive layer 330 and the third protective window adhesive layer 430 may have low adhesion, and the second protective window unit 300 including the first ink layer 320 (to show the first color) and the third protective window unit 400 including the second ink layer 420 (to show the second color) may be easily detached from the first protective window unit 200.

For example, the second and third protective window units 300 and 400 showing the different first and second colors may be easily attached to or detached from the first protective window unit 200, and a consumer may easily change the color of the protective window unit attached on the display device 100 into a desired color.

Hereafter, referring to FIG. 5, a display device using a protective window according to another embodiment will be described.

Figure 5:
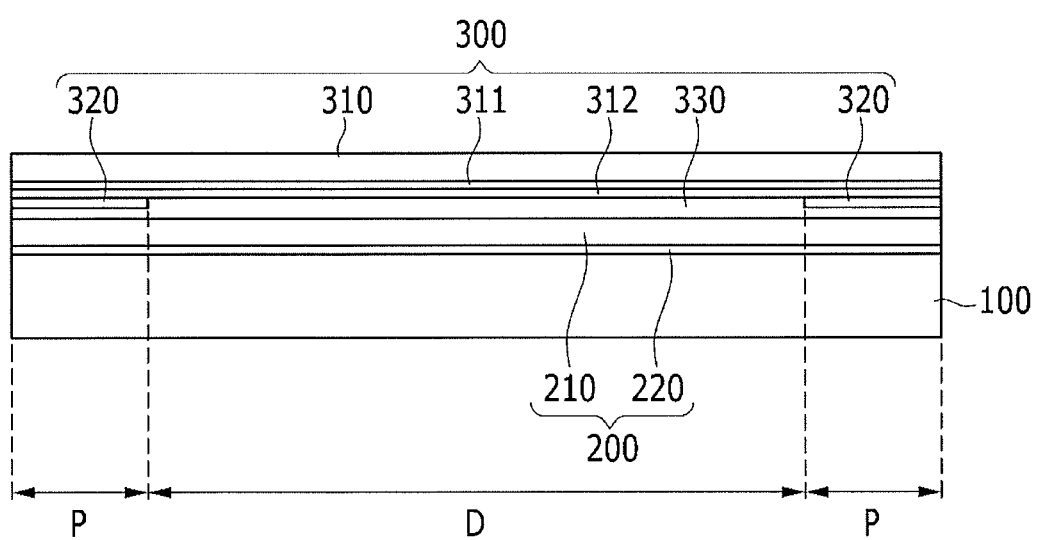
FIG. 5 illustrates a cross-sectional view of a display device using a protective window according to another embodiment.

FIG. 5 illustrates a cross-sectional view of a display device using a protective window according to another embodiment.

The display device using a protective window according to the present embodiment may have the same structure as the display device using a protective window according to the embodiment of FIG. 2, except for the second protective window unit 300. Thus, repeated detailed descriptions of the same components may be omitted herein.

Referring to FIG. 5, the first protective window unit 200 and the second protective window unit 300 may be sequentially disposed on or over the display device 100. The second protective window unit 300 may include a display area D (through which an image displayed on the display device 100 may be seen) and a peripheral area P (that shows a color).

The second protective window unit 300 may include a second protective window 310, a pattern adhesive layer 311, a pattern layer 312, a first ink layer 320, and a second protective window adhesive layer 330.

The second protective window 310 may be made of or may include, e.g., transparent glass, plastic, or the like.

The pattern adhesive layer 311 may be on one surface of the second protective window 310 and may be made of or may include, e.g., a transparent adhesive.

The pattern layer 312 may be on one surface of the pattern adhesive layer 311, and may have a predetermined pattern formed therein. The predetermined pattern may be formed at a region corresponding to or overlying the peripheral area P. The pattern layer 312 may be adhered on the one surface of the second protective layer 310 by the pattern adhesive layer 311.

The first ink layer 320 may show a first color, and may be on one surface of the pattern layer 312. The first ink layer 320 may be in the peripheral area P.

The second protective window adhesive layer 330 may be on the one surface of the pattern layer 312 and on one surface of the first ink layer 320. The second protective window adhesive layer 330 may adhere the second protective window 310 on the first protective window unit 200 (the second protective window 310 including the pattern adhesive layer 311, the pattern layer 312, and the first ink layer 320 disposed thereon).

The second protective window adhesive layer 330 may be made of or may include, e.g., a transparent adhesive such as acryl adhesive, urethane adhesive, polyimide adhesive, polyethylene adhesive, or epoxy adhesive.

The second protective window adhesive layer 330 may have relatively low adhesion, and the second protective window unit 300 may be easily detached from the first protective window unit 200. The adhesion of the second protective window adhesive layer 330 may be set to, e.g., about 500 g/25 mm or less. In an implementation, the adhesion of the second protective window adhesive layer 330 may be set to, e.g., about 10 g/25 mm to 100 g/25 mm.

The second protective window unit 300 (showing the color and the predetermined pattern) may be easily detached from the first protective window unit 200, and another protective window unit (showing a different color and a different pattern) may be adhered on the first protective window unit 200.

By way of summation and review, an ink layer may be formed on a protective window and may show a color, or an ink layer showing a color may be formed on a film and the film may be attached on the protective window such that the protective window shows the color. In such a method, a color that may show through the protective window may be fixed or limited to one color.

The embodiments may provide a technique for facilitating attachment/detachment of a protective window showing a color in a display device including a protective window.

According to an embodiment, the protective window adhesive layer (having a relatively low adhesion) may facilitate attachment/detachment of the protective window unit showing a color. Thus, a consumer may easily change the color of the protective window unit attached to the display device into a desired color.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of symbols>

| | |
|---|---|
| 100: Display device | 200: First protective window unit |
| 210: First protective window | 300: Second protective window unit |
| 310: Second protective window | 311: Pattern adhesive layer |
| 312: Pattern layer | 320: First ink layer |
| 330: Second protective window adhesive layer | |
| 400: Third protective window unit | |
| 410: Third protective window | 420: Second ink layer |
| 430: Third protective window adhesive layer | |

What is claimed is:

1. A display device, comprising:
   a display unit that displays an image;
   a first protective window on the display unit; and
   a second protective window unit on the first protective window, the second protective window unit including a display area that displays the image and a peripheral area around the display area,
   wherein:
   the second protective window unit includes:
      a second protective window;
      an ink layer in the peripheral area on a first surface of the second protective window, the ink layer showing a color; and
      a second protective window adhesive layer located on the display area of the second protective window unit, on a surface of the ink layer opposite the first surface of the second protective window, and between the second protective window and the first protective window,
   the second protective window unit is adhered on the first protective window by the second protective window adhesive layer, and
   the second protective window adhesive layer has an adhesion to the first protective window of about 10 g/25 mm to about 100 g/25 mm.

2. The display device as claimed in claim 1, wherein the second protective window adhesive layer includes an acryl adhesive, a urethane adhesive, a polyimide adhesive, a polyethylene adhesive, or an epoxy adhesive.

3. The display device as claimed in claim 2, further comprising a pattern layer between the second protective window adhesive layer and the second protective window, between the second protective window and the first protective window, and between the ink layer and the second protective window, the pattern layer having a pattern formed at a region overlying the peripheral area.

4. The display device as claimed in claim 3, wherein the pattern layer is adhered on the first surface of the second protective window by a pattern adhesive layer.

5. The display device as claimed in claim 4, wherein the first and second protective windows are made of transparent glass or plastic.

6. The display device as claimed in claim 5, wherein the color is a first color.

7. The display device as claimed in claim 5, wherein the color is a second color.

8. The display device as claimed in claim 1, wherein the display unit includes a liquid crystal display panel.

9. A display device system, comprising:
   a display unit that displays an image;
   a first protective window on the display unit; and
   at least two second protective window units, the at least two second protective window units being alternatively attachable to the first protective window such that only one of the second protective window units is on the first protective window at one time, wherein:
   each second protective window unit includes:
      a display area that displays the image and a peripheral area around the display area,
      a second protective window;
      an ink layer in the peripheral area on a first surface of the second protective window, the ink layer showing a color;
      a second protective window adhesive layer located on the display area of the second protective window unit, on a surface of the ink layer opposite the first surface of the second protective window, and between the second protective window and the first protective window,
   each second protective window unit being adhered on the first protective window by the second protective window adhesive layer, and
   each second protective window adhesive layer has an adhesion to the first protective window of about 10 g/25 mm to about 100 g/25 mm.

10. The display device system as claimed in claim 9, wherein:
   the ink layer of one of the second protective window units shows a first color,
   the ink layer of another one of the second protective window units shows a second color, and
   the first color is different from the second color.

11. The display device system as claimed in claim 9, wherein each second protective window adhesive layer includes an acryl adhesive, a urethane adhesive, a polyimide adhesive, a polyethylene adhesive, or an epoxy adhesive.

12. The display device system as claimed in claim 9, wherein the first and second protective windows are made of transparent glass or plastic.

13. The display device system as claimed in claim 9, wherein the display unit includes a liquid crystal display panel.

* * * * *